(12) United States Patent
Seigel

(10) Patent No.: US 9,792,102 B2
(45) Date of Patent: Oct. 17, 2017

(54) IDENTIFYING ISSUES PRIOR TO DEPLOYING SOFTWARE

(71) Applicant: Dell Products L.P., Round Rock, TX (US)

(72) Inventor: Jake Seigel, Halifax (CA)

(73) Assignee: QUEST SOFTWARE INC., Aliso Viejo, CA (US)

(\*) Notice: Subject to any disclaimer, the term of this patent is extended or adjusted under 35 U.S.C. 154(b) by 69 days.

(21) Appl. No.: 14/845,467

(22) Filed: Sep. 4, 2015

(65) Prior Publication Data

US 2017/0068526 A1 Mar. 9, 2017

(51) Int. Cl.
G06F 9/44 (2006.01)
G06F 9/445 (2006.01)
G06F 11/34 (2006.01)

(52) U.S. Cl.
CPC ............. G06F 8/61 (2013.01); G06F 8/71 (2013.01); G06F 11/34 (2013.01)

(58) Field of Classification Search
CPC .............................................. G06F 8/61–8/71
See application file for complete search history.

(56) References Cited

U.S. PATENT DOCUMENTS

| | | | | |
|---|---|---|---|---|
| 5,890,014 | A * | 3/1999 | Long | G06F 13/10 703/13 |
| 5,937,165 | A * | 8/1999 | Schwaller | H04L 12/2697 709/224 |
| 6,282,711 | B1 * | 8/2001 | Halpern | G06F 8/61 709/203 |
| 8,245,194 | B2 * | 8/2012 | Atkin | G06F 11/3688 717/106 |
| 8,250,570 | B2 * | 8/2012 | Suorsa | G06F 8/61 717/172 |
| 8,266,608 | B2 * | 9/2012 | Hecht | G06F 11/3636 714/35 |
| 8,417,569 | B2 * | 4/2013 | Gross | G06F 17/30861 705/14.41 |
| 8,490,084 | B1 * | 7/2013 | Alford | G06F 8/61 717/177 |
| 8,555,273 | B1 * | 10/2013 | Chia | G06F 8/665 717/168 |
| 8,677,315 | B1 * | 3/2014 | Anderson | G06F 8/60 717/101 |
| 8,839,222 | B1 * | 9/2014 | Brandwine | G06F 11/36 717/168 |
| 8,856,748 | B1 * | 10/2014 | Larsen | G06F 11/3668 717/125 |
| 8,856,774 | B1 * | 10/2014 | Kulaga | G06F 8/65 717/168 |

(Continued)

*Primary Examiner* — Tuan Q. Dam
*Assistant Examiner* — Zheng Wei
(74) *Attorney, Agent, or Firm* — Maschoff Brennan

(57) ABSTRACT

Systems and techniques for identifying potential problems associated with deploying a software package in a computing system are described. The software package may include multiple components that are installed in various locations in the computing system. Multiple agents that perform mock activities emulating the activities of the multiple components may be deployed in the computing system. Activity data may be gathered when the multiple agents are performing the mock activities and used to identify potential problems.

20 Claims, 6 Drawing Sheets

(56) References Cited

U.S. PATENT DOCUMENTS

| | | | |
|---|---|---|---|
| 9,021,452 B2* | 4/2015 | Kripalani | G06F 11/3664 705/27.1 |
| 9,021,453 B1* | 4/2015 | Zhang | G06F 21/56 717/126 |
| 9,122,805 B2* | 9/2015 | Baldwin | G06F 11/3696 |
| 9,208,235 B1* | 12/2015 | Liu | G06F 17/30864 |
| 9,317,637 B2* | 4/2016 | Archer | G06F 9/5077 |
| 2002/0188649 A1* | 12/2002 | Karim | G06F 21/566 718/104 |
| 2004/0226010 A1* | 11/2004 | Suorsa | G06F 8/61 717/174 |
| 2004/0261116 A1* | 12/2004 | Mckeown | H04L 12/24 725/109 |
| 2005/0027851 A1* | 2/2005 | McKeown | H04L 12/2874 709/224 |
| 2006/0048133 A1* | 3/2006 | Patzachke | G06F 8/65 717/168 |
| 2006/0080658 A1* | 4/2006 | Marion | G06F 8/61 717/177 |
| 2006/0085404 A1* | 4/2006 | Kusunoki | G06F 8/65 |
| 2006/0155777 A1* | 7/2006 | Shih | G06F 8/61 |
| 2006/0248522 A1* | 11/2006 | Lakshminarayanan | G06F 8/61 717/174 |
| 2007/0006159 A1* | 1/2007 | Hecht | G06F 11/3644 717/124 |
| 2008/0028393 A1* | 1/2008 | Yoshizawa | G09B 23/28 717/176 |
| 2009/0055522 A1* | 2/2009 | Shen | G06F 11/3495 709/224 |
| 2009/0164201 A1* | 6/2009 | Celli | H04L 41/20 703/21 |
| 2009/0199047 A1* | 8/2009 | Vaitheeswaran | G06F 11/3409 714/47.2 |
| 2009/0199160 A1* | 8/2009 | Vaitheeswaran | G06F 11/3414 717/124 |
| 2010/0100970 A1* | 4/2010 | Roy-Chowdhury | G06F 8/71 726/30 |
| 2012/0110551 A1* | 5/2012 | Fink | G06F 21/577 717/128 |
| 2012/0317551 A1* | 12/2012 | Hecht | G06F 11/3644 717/128 |
| 2012/0323553 A1* | 12/2012 | Aslam | G06F 9/455 703/28 |
| 2014/0033183 A1* | 1/2014 | Brown | G06F 11/3636 717/131 |
| 2014/0109066 A1* | 4/2014 | Dhanda | G06F 8/65 717/131 |
| 2014/0189680 A1* | 7/2014 | Kripalani | G06F 11/3664 717/176 |
| 2014/0372984 A1* | 12/2014 | Stroomer | G06F 8/61 717/124 |
| 2015/0082293 A1* | 3/2015 | Thomas | G06F 8/65 717/168 |
| 2015/0193230 A1* | 7/2015 | Gaikwad | G06F 8/71 717/120 |
| 2015/0339219 A1* | 11/2015 | Baldwin | G06F 11/3696 717/124 |
| 2016/0062755 A1* | 3/2016 | Shimamura | G06F 8/61 717/177 |
| 2016/0078327 A1* | 3/2016 | Wakamatsu | G06F 11/36 358/1.15 |
| 2016/0179498 A1* | 6/2016 | Das | G06F 8/65 717/171 |
| 2016/0188451 A1* | 6/2016 | Xia | G06F 11/3688 717/135 |
| 2016/0239402 A1* | 8/2016 | Zieder | G06F 9/44 |
| 2016/0254982 A1* | 9/2016 | Kuznetsov | H04L 41/04 |
| 2016/0259699 A1* | 9/2016 | Greenspan | G06F 11/261 |
| 2016/0306735 A1* | 10/2016 | Adderly | G06F 11/3664 |

* cited by examiner

IDENTIFYING ISSUES PRIOR TO DEPLOYING SOFTWARE

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computer system associated with a business is typically referred to as an enterprise system. A large amount of effort may be spent when deploying software in an enterprise system to provide for a smooth and seamless deployment. A major component of deploying software in an enterprise system may include determining whether the configuration can support the software, whether deploying the software would cause any problems, etc. Typically, the software is either configured prior to installation or after installation. Regardless of when the software is configured, system issues are detected only after the product has been installed. For example, the system issues may include configuration issues, network topology issues, issues with credentials, issues with permissions, domain trust issues, network performance issues (e.g., network issues or hardware issues), and the like.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques for identifying potential problems associated with deploying a software package in a computing system are described. The software package may include multiple components that are installed in various locations in the computing system. Multiple agents that perform mock activities emulating the activities of the multiple components may be deployed in the computing system. Activity data may be gathered when the multiple agents are performing the mock activities and used to identify potential problems.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
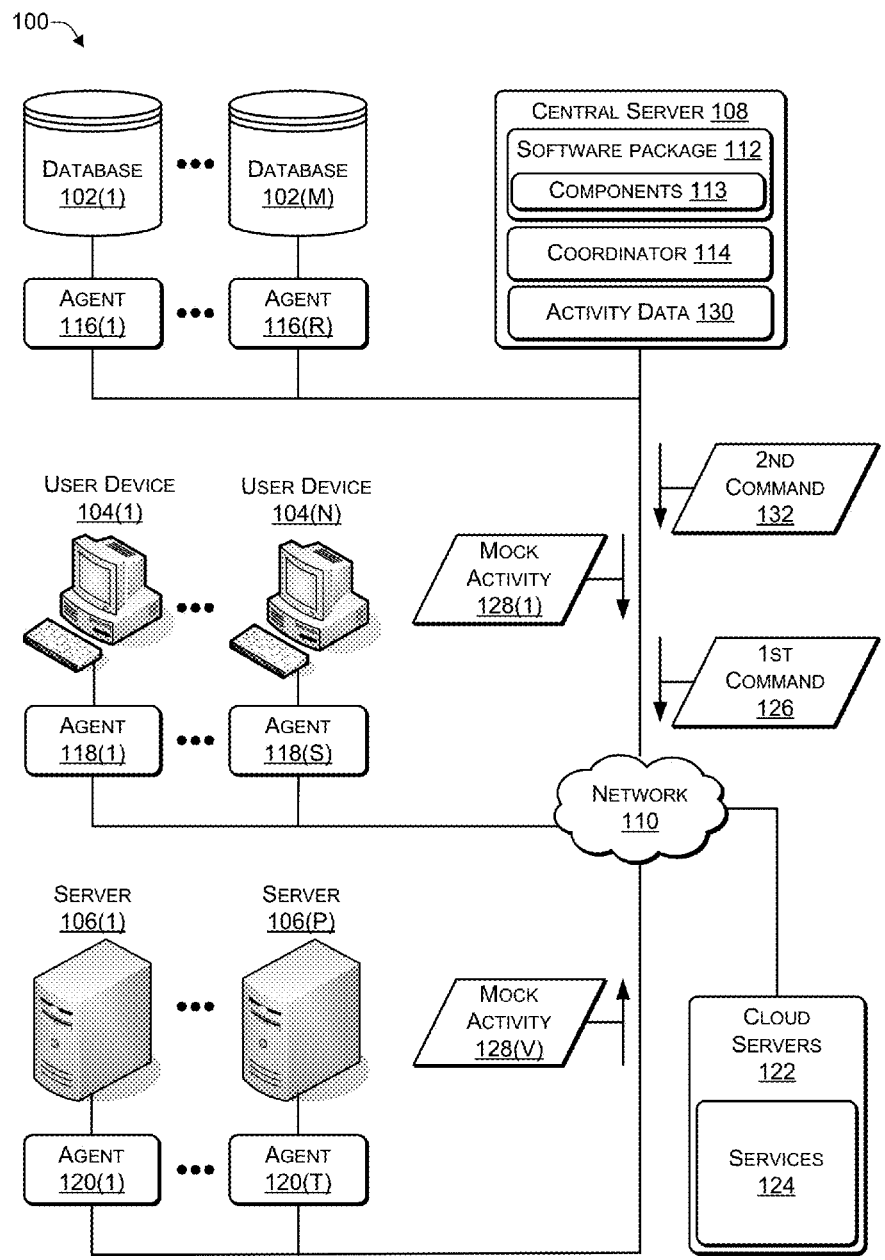
FIG. 1 is a block diagram illustrating a computing system that includes agents to emulate components according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Systems and techniques are described herein to deploy, in a computer system, agents (e.g., software agents) to emulate components of a software package and identify potential problems prior to deploying the software components. The agents may be relatively small in size (e.g., as compared to the components that they are emulating), enabling the agents to be deployed quickly. The agents may engage in mock activities to emulate the components of the software. Coordinator software may gather data associated with the mock activities, correlate the data, display the data, and highlight potential problems. For example, a classifier, such as a support vector machine or other machine learning algorithm, may be trained to identify potential problems. A system administrator may modify portions of the computer system, instruct the agents to emulate the components, view additional activity data, and determine whether the potential problems have been addressed. The process of emulating the components, gathering activity data, identifying potential problems, and modifying the computer system may be repeated until the potential problems have been addressed. After the potential problems have been addressed, the coordinator software may instruct each agent to download and install the software component that each agent was emulating (or the coordinator software may download and install the software component that each agent was emulating). After the software components are installed, the agents may be removed (e.g., uninstalled) from the computer system or instructed to cease activities (e.g., become dormant). Because potential problems are addressed using the agents to perform mock activities (e.g., before installing the software components), after the software components of the software package are installed, fewer problems may arise, resulting in a faster and smoother deployment. In some cases, both the software components and the agents may be installed at the same time. The agents may be instructed to perform mock activities while the software components are instructed to remain inactive (e.g., dormant) After the computer system has been modified to address problems arising from the mock activities, the software components may be instructed to perform activities while the agents may be instructed to cease activities (e.g., become dormant).

Certain types of software packages that are deployed in an enterprise's computer system may include multiple components that are deployed across the computer system. For example, auditing software (e.g., Dell® Change Auditor™) may be deployed to enable a business to comply with laws or standards, such as the Sarbanes-Oxley ("SOX") Act, Health Insurance Portability and Accountability Act (HIPAA), Federal Information Security Management Act (FISMA), payment card industry (PCI) data security standard (DSS), Statement on Auditing Standards (SAS), etc. The auditing software may be used to audit various portions of the computer system, such as structured query language (SQL) server, file servers, Microsoft® Exchange®, Active Directory® (AD), network attached storage (NAS), AD lightweight directory services (ADLDS), AD Queries, Microsoft SharePoint®, Microsoft Lync®, VMware®, NetApp®, Windows® File Server, EMC® server, etc. As another example, identity management software may be deployed to enable non-technical people (e.g., rather than computer professionals, such as information technology (IT) people) in a company to manage permissions. Event logging and change reporting for enterprise applications and services are cumbersome, time-consuming and, in some cases, impossible using native IT auditing tools. The software package that comprises the components may provide real-time change auditing, in-depth forensics, and comprehensive reporting on changes made to configuration data, user data, and administrator data for Active Directory, ADLDS, AD Queries, Exchange, SharePoint, Lync, VMware, NetApp, Windows File Servers, EMC, and SQL Server. The software package may track detailed user activity for web storage and services, logon and authentication activity and other services across a computer network of a business (e.g., enterprise network). The software package may enable the business to comply with auditing laws and standards by providing reports for SOX, PCI DSS, HIPAA, FISMA, SAS, etc.

Typically, when installing a complex software package, each of the components may be installed over a period of time, and problems may be addressed as they arise. For example, a first component may be installed and the behavior of the computer system may be monitored to identify potential problems. After any potential problems associated with the first component are addressed, a second component may be installed and the behavior of the computer system may be monitored to identify potential problems, and so on, until each component of the software package has been installed. However, there are several problems with this approach. First, installing the software package in such a piecemeal fashion may result in the deployment of the software package being dragged out over weeks or even months. Second, monitoring the interactions between all of the components of the software package is not possible until all the components have been installed. For example, only after a final component of the software package is installed can the interactions between all the components be monitored. Third, installing a new component may result in new interactions that result in new problems that were not previously present. For example, a third component may be installed after determining that interactions between a first component and a second component are problem free. However, the third component may cause problems with interactions between the first component and the second component. Fourth, problems, such as network traffic bottlenecks, performance degradation, misconfigured permissions, improper credentials, etc., may not appear until specific components have been installed, causing the deployment to be delayed.

To reduce the typical problems that may be encountered when deploying a software package, multiple agents that emulate the components of the software package may be deployed across an enterprise network prior to deploying the components of the software package. The size of the agents may be relatively small compared to the size of the corresponding components that are being emulated, enabling the agents to be quickly installed. The agents may engage in mock activities that emulate the behavior of the corresponding components of the software package. For example, a first agent may send data to a second agent. The data may cause the second agent to perform one or more actions, such as writing data to a database, sending the data to another agent, sending additional data to one or more additional agents, etc. Coordinator software executing on a central server may monitor the mock activities and gather data for analysis.

The coordinator software may analyze the gathered data to identify potential problems and, in some cases, suggest potential solutions. For example, the coordinator software may analyze the data associated with the mock activities and identify potential problems, such as servers with inadequate resources (e.g., insufficient processing power, insufficient memory, insufficient bandwidth, etc.), incorrect permissions, incorrect credentials, an inefficient network topology, performance bottlenecks, etc. The coordinator software may suggest potential solutions, such as additional resources (e.g., faster processor, more memory, more or faster input/output (I/O) hardware), modifications to the permissions, modifications to the credentials, network topology modifications, etc.

A system administrator may modify the enterprise network based on the potential problems identified based on the data gathered from the mock activities of the agents and then instruct the agents to resume performing the mock activities to determine if the modifications have addressed the potential problems. The system administrator may move agents around to address potential problems. For example, a first agent that consumes a large amount of resources (e.g., process power, memory, bandwidth, or the like) may be deployed on a first server with relatively few resources. The system administrator may move the first agent from being hosted by the first server to being hosted by a second server that has more resources than the first server. In some cases, the process of instructing the agents to perform mock activities, gathering data, analyzing the data, displaying the data, and modifying the network may be repeated until the system administrator is satisfied that the potential problems have been addressed. Once the system administrator is satisfied that the potential problems have been addressed, the components corresponding to the agents may be installed and the agents removed.

Deploying agents to engage in mock activities that emulate the interactions of the components of the software package may enable a system administrator to (1) quickly determine whether each component can communicate with other components and with portions of the enterprise network and (2) identify performance bottlenecks. Furthermore, once potential problems have been addressed, the components of the software package can be installed and the agents removed to seamlessly switch over from agents engaging in mock activities to the actual components of the software package engaging in actual activities.

By installing software agents to perform activities emulating components of a software package enables potential problems to be identified and resolved prior to deploying the actual components. The agents may perform activities that simulate memory usage, processor usage, and network communications that would be expected in a typical installation. In addition, the network may be modified and the location and configuration of the agents may be modified to reduce potential problems. For example, the data gathered from the mock activities of the agents may reveal that a first agent that is deployed on a first server is using a relatively small portion of the first server's capacity while a second agent that is deployed on a second server is using a relatively large portion of the second server's capacity.

After testing the planned deployment using mock agents, and the performance load is acceptable, the enterprise network may be quickly switched from agents engaged in mock activities to components engaged in actual activities. Because potential problems have been addressed, deployment of the components of the software package may be smooth and encounter relatively few problems, resulting in a faster deployment of the software package and with fewer problems encountered. In addition, the techniques and system described herein may be used for enterprise networks that use customer premises equipment as well as hybrid network that use a mixture of customer premises equipment and cloud-based services. For example, the system and techniques may be used to determine whether agents are be able to communicate with the cloud components to identify potential connection problems, potential bandwidth problems, and the like.

FIG. 1 is a block diagram illustrating a computing system 100 that includes agents to emulate components according to some embodiments. The computing system 100 may include multiple types of network elements, including a representative one or more databases, such as a database 102(1) to a database 102(M), a representative one or more user devices, such as a user device 104(1) to a user device 104(N), and a representative one or more servers, such as a server 106(1) to a server 106(P), where M>1, N>1, and P>1, and where M, N, and P are not necessarily the same. Of course, the computing system 100 may include other network elements besides the databases 102, the user devices 104, and the servers 106. The user devices 104 may include workstations, laptops, tablets, wireless phones, other types of computing devices used to access other network elements of the computing system 100, or any combination thereof. The computing system 100 may be a network associated with a business, e.g., an enterprise network. Each of the network elements 102, 104, and 106 may include one or more processors and one or more computer readable media (e.g., memory) that include instructions that are executable by the one or more processors. For example, each of the network elements 102, 104, and 106 may host (e.g., execute) an operating system, software applications, etc. The network elements 102, 104, and 106 may be communicatively connected to a central server 108 via a network 110. The network 110 may include wireless technologies (e.g., code division multiple access (CDMA), global system for mobile (GSM), Institute of Electrical and Electronic Engineers (IEEE) 802.11x, WiFi®, Bluetooth®, or the like), wireline technologies (e.g., Ethernet, etc.), other communication technologies, or any combination thereof.

The business may desire to deploy a software package 112 that includes multiple components 113 that are to be deployed across the computing system 100. For example, the software package 112 may enable the business to comply with Federal (or local) regulations, such as SOX, HIPAA, etc. To identify potential problems before deploying (e.g., installing) the components 113 of the software package 112, a system administrator (or other user) may install a coordinator (e.g., a software application) 114 on the central server 108. The coordinator 114 may deploy (e.g., install) multiple agents, such agents 116(1) to 116(R), 118(1) to 118(S), and 120(1) to 120(T) (where R>1, S>1, T>1 and where R, S, and T may be different from each other and from M, N, and P), to perform mock activities 128(1) to 128(V) (where V>1) mimicking (e.g., emulating) activities of the components 113 of the software package 112. For example, the components 113 may monitor events occurring in the computing system 100 and generate event logs associated with the events. The event logs may be generated and stored to provide compliance with auditing laws (e.g., SOX, HIPAA, etc.) or auditing standards (e.g., DSS, SAS, etc.). The agents 116, 118, 120 may generate mock event logs to emulate the events logs generated by the components. The agents 116, 118, 120 may be software applications that may not, in some cases, have a one-to-one relationship with the network elements 102, 104, 106, though such a relationship is illustrated in FIG. 1.

The coordinator 114 may identify a location in which to install each of the agents 116, 118, 120. For example, the coordinator 114 may identify locations in which the components 113 are to be deployed and install the agents 116, 118, 120 in the identified locations. In this way, the activities of the agents 116, 118, 120 may emulate the activities of the components 113.

In some cases, the computing system 100 may be a hybrid network, e.g., the network elements 102, 104, 106 may be located at premises of the business (e.g., customer premises equipment (CPE)) while a portion of the computing system 100 may be hosted in one or more cloud computing environments. For example, the computing system 100 may include one or more cloud servers 122 that host one or more services 124 that are provided to the business.

After the agents 116, 118, 120 have been deployed in the computer system 100, the coordinator 114 may send a first command 126 instructing one or more of the agents 116, 118, 120 to initiate the mock activities 128 emulating components 113 of the software package 112. In some cases, the coordinator 114 may selectively instruct some (but not all) of the agents 116, 118, 120 to initiate the mock activities 128 to enable particular data associated with particular portions of the computing system 100 to be measured. For example, to measure performance associated with the databases 102, the coordinator 114 may instruct the agents 118, 120 to (temporarily) stop performing some of the mock activities 128 and instruct the agents 116 to initiate some of the mock activities 128. In some cases, a system administrator (or other user) may use the coordinator 114 to selectively instruct one or more of the agents 116, 118, 120 to initiate the mock activities 128 or stop performing the mock activities 128 to gather data associated with particular portions of the computing system 100.

In response to receiving the first command 126, one or more of the agents 116, 118, 120 may initiate the mock activities 128(1) to 128(V) emulating the components 113 of the software package 112. For example, the mock activities 128 may include reading data from the databases 102, emulating user activity at the user devices 102, causing the servers 106 to perform actions, and the like. The mock activities 128 of the agents 116, 118, 120 may include sending mock data to network elements 102, 104, 106 and the cloud servers 122 in the computer system 100.

The coordinator 114 may collect activity data 130 associated with the mock activities 128 performed by the agents 116, 118, 120 to identify potential problems. In some cases, the activity data 130 may be gathered within a predetermined time period (e.g., within N hours, where N>0). For example, the coordinator 114 may include a classifier (e.g., a support vector machine or other machine learning algorithm) that has been trained to identify potential problems based on the activity data 130. The coordinator 114 may correlate the activity data 130 according to one or more specified criteria. For example, the coordinator 114 may correlate the activity data 130 based on the mock activities 128 associated with the databases 102 to identify potential problems associated with the databases, such as determining whether each database is near maximum throughput, etc. The coordinator 114 may correlate the activity data 130 based on the mock activities 128 associated with the user devices 102 to identify potential problems, such as a lag associated with receiving a response after sending a command to each of the network elements 102, 104, 106, performance issues associated with one or more of the user devices 102, etc. The coordinator 114 may correlate the activity data 130 based on the mock activities 128 associated with the servers 106 to identify potential problems, such as whether the each of the servers 106 is close to running out of one or more resources (e.g., processing power, memory/storage, bandwidth, etc.). The coordinator 114 may correlate the activity data 130 based on the mock activities 128 associated with the cloud servers 122 to identify potential problems, such as whether the network connections to access the cloud servers 122 are sufficient, etc. The coordinator 114 may correlate the activity data 130 based on the mock activities 128 associated with accessing (e.g., reading, writing, etc.) data to identify potential problems with permissions, credentials, and the like. In addition to identifying potential problems based on the correlated data, the coordinator 114 may provide suggestions (e.g., potential solutions) to address the potential problems.

A system administrator (or other user) may modify the computing system 10 after reviewing the correlated data, the potential problems, the potential solutions, or any combination thereof. For example, the system administrator may modify resources (e.g., processing power, memory, storage, network throughput, and the like) of one or more of the databases 102, the user devices 104, or the servers 106. The system administrator may modify the topology of the computing system 100 or the agents 116, 118, 120. For example, additional database(s) may be added to the databases 102, additional user device(s) may be added to the user devices 104, additional server(s) may be added to the servers 106, etc. An agent executing on a first server located in a first country may be moved to a second server in a second country due to a communication delay. An agent running on a first server may be moved to a second server that has more resources than the first server. Additional cloud services may be added to the services 124. Additional network connections (or faster network connections) may be added between two or more network communications. For example, a wireless connection between two network elements may be replaced with a wired connection with higher throughput than the wireless connection. The system administrator may modify configuration parameters associated with the computing system 100, such as permissions associated with one or more of the agents 116, 118, 120, credentials associated with one or more of the agents 116, 118, 120, permissions associated with folders stored on the network elements 102, 104, 106, ports configured for communications between the network elements 102, 104, 106 and the cloud servers 122, etc.

After the system administrator has made modifications to the computing system 100, the system administrator may use the coordinator 114 to send the first command 126, instructing one or more of the agents 116, 118, 120 to perform the mock activities 128. The coordinator 114 may gather additional activity data 130, analyze the activity data 130 to identify potential problems, and suggest potential problems. The system administrator may further modify the computing system 100 based on the additional activity data. This process of gathering the activity data 130 and modifying the computing system 100 may continue until the system administrator is satisfied that the potential problems have been adequately addressed.

After the system administrator is satisfied that the potential problems have been addressed, the coordinator 114 may send a second command 132 to the agents 116, 118, 120. The second command 132 may instruct the agents 116, 118, 120 to download and install the corresponding component of the software package 112 whose activities the agents 116, 118, 120 were emulating. After the components 113 of the software package 112 have been installed in the computing system 100, the coordinator 114 may remove (e.g., uninstall) the agents 116, 118, 120.

Thus, prior to deploying the software package 112 with the components 113, the coordinator 114 may install multiple agents 116, 118, 120 in the computing system 100. Individual agents of the agents 116, 118, 120 may correspond to individual components of the components 113. The agents 116, 118, 120 may be installed in locations in the computing system 100 where the corresponding components 113 are to be installed when the components 113 of the software package 112 are deployed. The agents 116, 118, 120 may perform the mock activities 128 that emulate activities similar to the activities performed by the components 113. For example, the agents 116, 118, 120 may send mock data amongst each other, to the network elements 102, 104, 106, to the cloud servers 122, or any combination thereof. The coordinator 114 may gather and analyze the activity data 130 associated with the mock activities 128 performed by the agents 116, 118, 120 to identify potential problems. The coordinator 114 may suggest one or more potential solutions, e.g., "upgrade to a processor with more cores," "add at least 8 gigabytes (GB) of random access memory (RAM)," "add at least 20 terabytes (TB) of storage," "upgrade the networking between a first network element and a second network element from 10Base-T to 100Base-T to improve throughput," "add a new networking link between third network element and a fourth network element," "change the permissions on a particular folder from group A to group A & B," change the credentials associated with particular agents from X to Y," etc.

A system administrator may modify one or more of the hardware, software, configuration parameters, or other aspects of the computing system 100 based on the potential problems that are identified by the coordinator 114. The agents 116, 118, 120 may be instructed to perform additional mock activities and additional activity data may be gathered to determine whether the potential problems have been addressed and whether any additional problems may be present. This process may continue until the system administrator is satisfied that potential problems have been adequately addressed.

The agents 116, 118, 120 may be instructed to download and install the corresponding components 113. For example, the agent 116(1) that emulates activities of a first component of the components 113 may download and install the first component, the agent 116(R) that emulates activities of an Rth component of the components 113 may download and install the Rth component, and so on. After the coordinator 114 determines that the components 113 have been downloaded and installed and are operating properly, the coordinator 114 may remove (e.g., uninstall) the agents 116, 118, 120 from the computing system 100. The agents may be relatively small in size (e.g., compared to the components that the agents are emulating), enabling the agents to be quickly installed.

In this way, potential problems may be identified quickly and addressed before the actual components are deployed. In addition, because the agents 116, 118, 120 are performing the mock activities 128, the computing system 100 may perform fewer permanent changes as compared to actual deployment of the software package 112. In contrast, in a conventional deployment where the actual components are deployed, problems arising during the deployment may result in permanent changes, such as protected data being inadvertently deleted or modified etc. If some of these changes are unintended then, in a conventional deployment, further effort may be required to undo the changes. By using the agents 116, 118, 120 to perform the mock activities 128, problems that arise may not result in permanent changes, such as protected data being inadvertently deleted or modified etc. Once the computing system 100 has been modified to address potential problems, the components 113 corresponding to the agents 116, 118, 120 may be installed and the agents 116, 118, 120 may be deleted (e.g., uninstalled). Deploying the components 113 of the software package 112 in the computing system 100 may result in relatively few problems occurring compared to a conventional deployment because the potential problems in the computing system 100 were identified and addressed prior to deploying the components 113.

Figure 2:
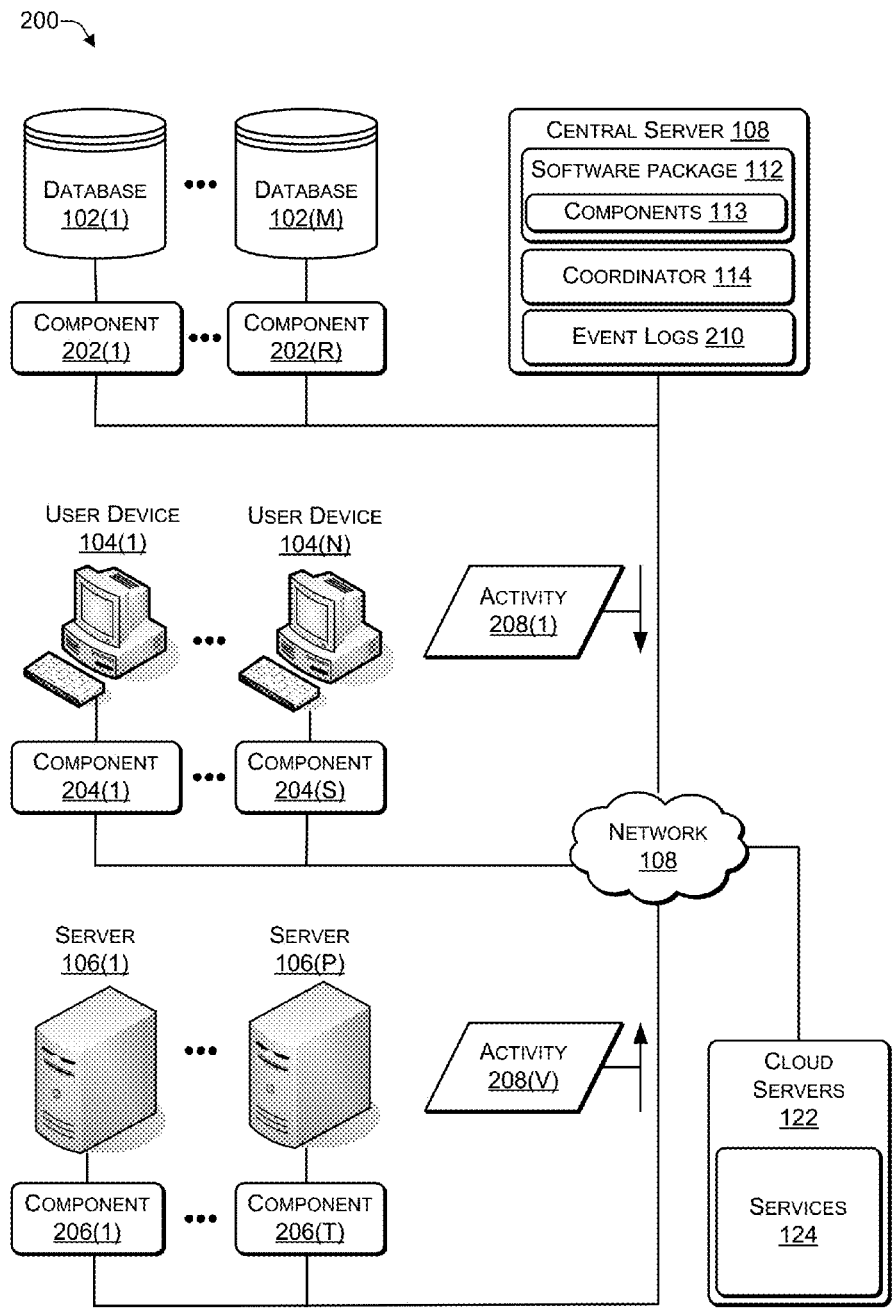
FIG. 2 is a block diagram illustrating a computing system that includes components of a software package according to some embodiments.

FIG. 2 is a block diagram illustrating a computing system 200 that includes components of a software package according to some embodiments. The computing system 200 illustrates the computing system 100 of FIG. 1 after the components 113 of the software package 112, e.g., components 202, 204, and 206, have been installed and the agents 116, 118, 120 uninstalled.

As illustrated in FIG. 2, the components 202(1) to 202(R) corresponding to agents 116(1) to 116(R), respectively, may be installed. The components 204(1) to 204(S) corresponding to agents 118(1) to 118(S), respectively, may be installed. The components 206(1) to 206(T) corresponding to agents 120(1) to 120(T), respectively, may be installed. The components 202, 204, 206 may perform various activities 208(1) to 208(V) that were emulated by the agents 116, 118, 120. For example, the components 202, 204, 206 may monitor events occurring in the computing system 200 and generate event logs 210 associated with the events. The event logs 210 may be stored to provide compliance with auditing laws (e.g., SOX, HIPAA, etc.) or auditing standards (e.g., DSS, SAS, etc.). For example, the event logs 210 may include a logon event log associated with an event in which a user used a set of credentials (e.g., username and password) to logon to a network element, a logoff event log associated with an event in which a user logged off after being logged on, a failed logon event log associated with an event in which a user failed to logon to a network element using a set of user credentials, a directory accessed event log associated with an event in which a directory was accessed, a file created event log associated with an event in which a file was created, a directory accessed event log associated with an event in which a directory was accessed, a data accessed event log associated with an event in which data was accessed (e.g., read or written), a copy data event log associated with an event in which data was copied, etc.

The components 202, 204, 206 may send data (e.g., event logs) within the system 200 (e.g., including the network elements 102, 104, and 106 and the cloud servers 122). Because potential problems associated with the mock activities 128 of the agents 116, 118, 120 have been addressed prior to deploying the components 202, 204, 206, the activities 208 performed after the components 202, 204, 206 are deployed may result in relatively few problems arising as compared to a conventional deployment. For example, in a conventional deployment, the components 202, 204, 206 may be deployed in the computing system 200 without deploying the agents 116, 118, 120 to emulate the activities of the components 202, 204, 206.

Figure 3:
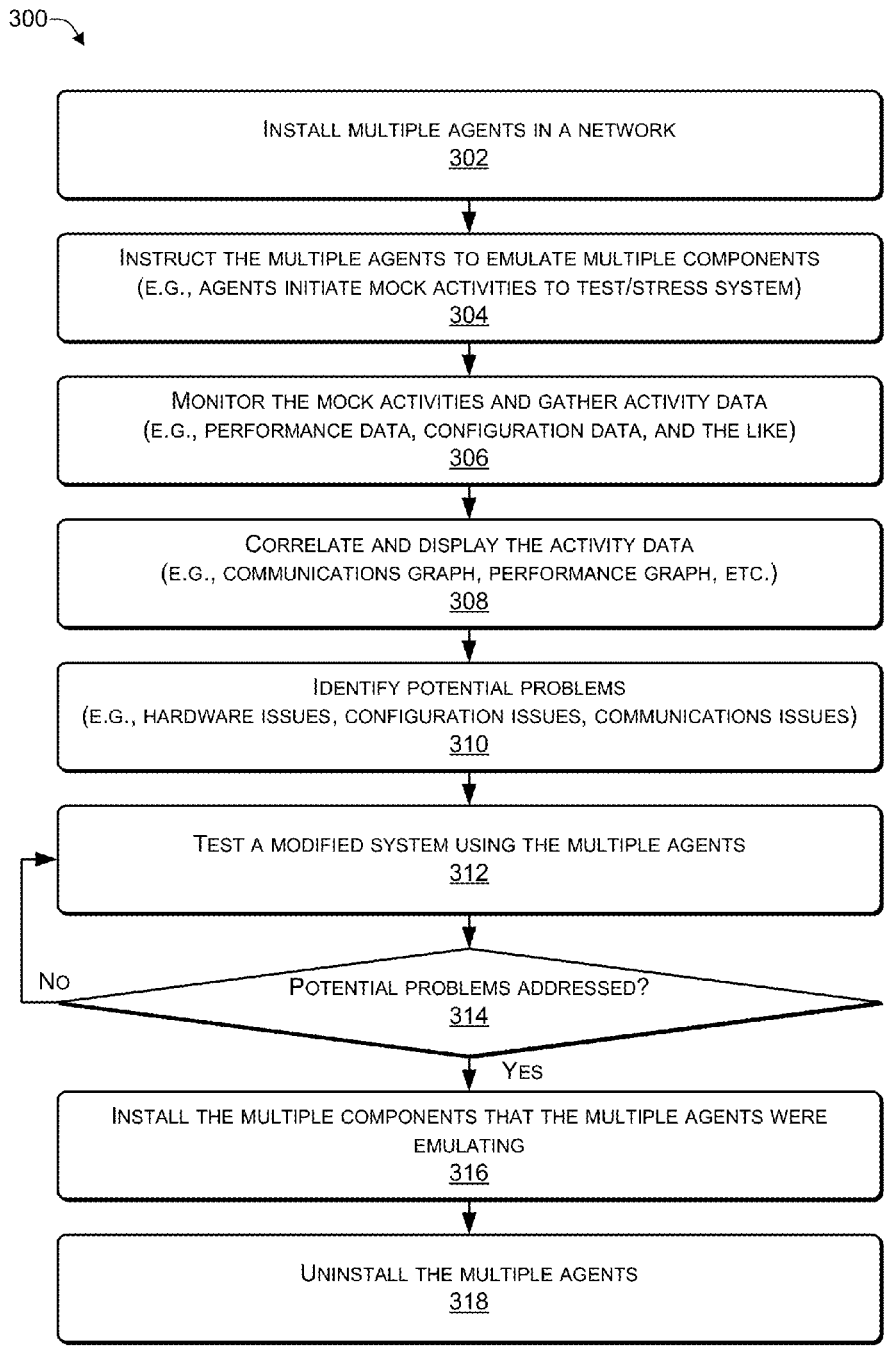
FIG. 3 is a flowchart of a process that includes installing multiple agents in a network according to some embodiments.
Figure 4:
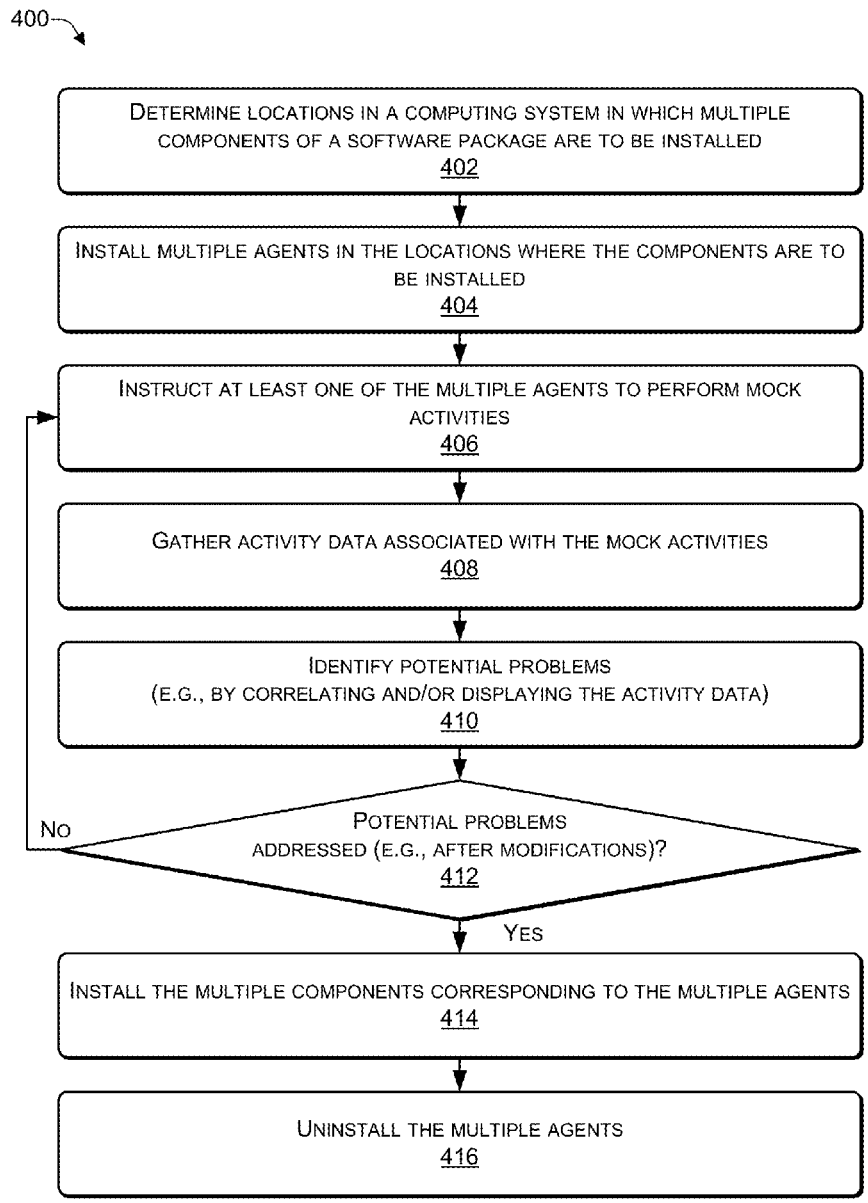
FIG. 4 is a flowchart of a process that includes gathering data associated with mock activities according to some embodiments.
Figure 5:
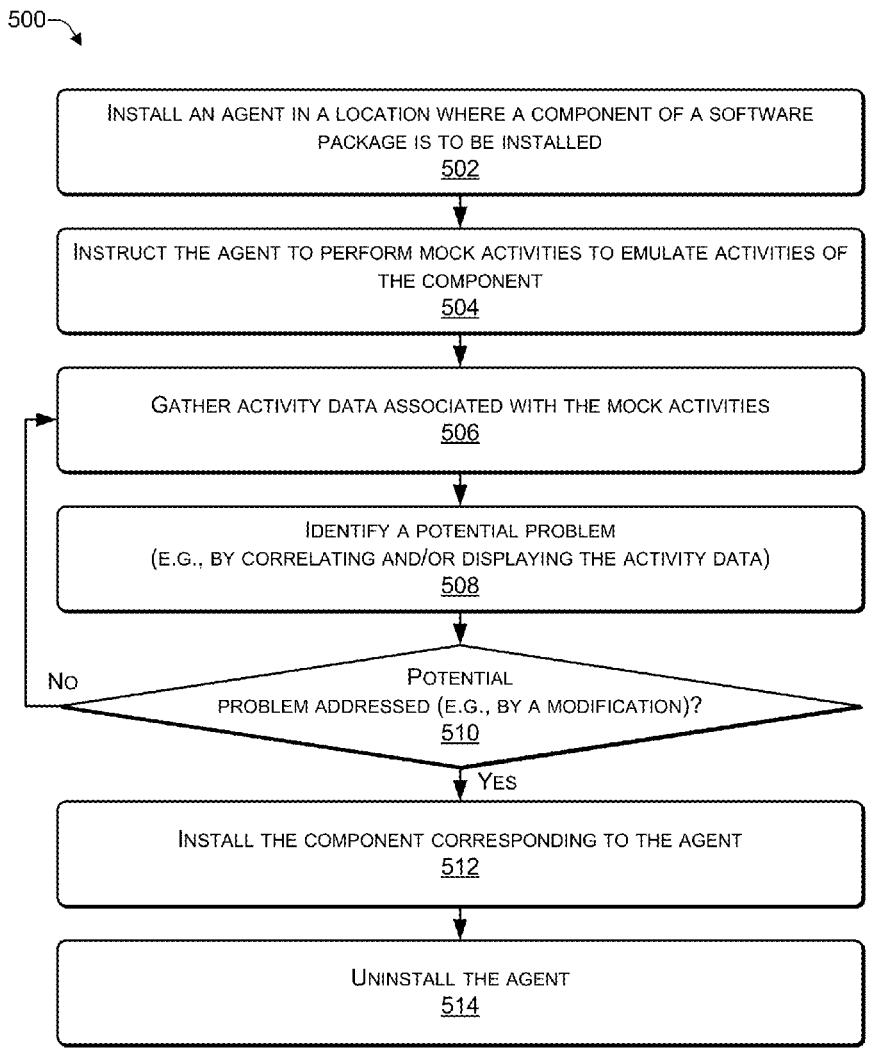
FIG. 5 is a flowchart of a process that includes instructing an agent to perform mock activities to emulate activities of a component according to some embodiments.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to FIGS. 1, 2, and 3 as described above. However, other models, frameworks, systems and environments may also be used to implement these processes.

FIG. 3 is a flowchart of a process 300 that includes installing multiple agents in a network according to some embodiments. For example, the process 300 may be performed by software, such as the coordinator 114 of FIG. 1, executing on the central server 108.

At 302, multiple agents may be installed in a network. At 304, individual agents of the multiple agents may be instructed to emulate individual components of the multiple components. For example, in FIG. 1, the coordinator 114 may determine particular locations where the components 113 are to be installed and install the agents 116, 118, 120 in the particular locations in the computing system 100. In response to receiving the first command 126, one or more of the agents 16, 118, 120 may initiate the mock activities 128 (e.g., generating event logs or performing activities that cause event logs to be generated) to emulate activities of the components 113.

At 306, the mock activities may be monitored and data related to the mock activities (e.g., performance-related data, configuration-related data, etc.) may be gathered. At 308, the activity data may be correlated and displayed. At 310, potential problems may be identified based on the activity data. For example, in FIG. 1, the coordinator 114 may monitor the mock activities 128 and gather the activity data 130 over a predetermined period of time (e.g., N hours or M days). The activity data 130 may be correlated to identify specific types of problems. For example, the activity data 130 may be correlated based on various criteria to identify configuration issues (e.g., permissions of stored data are incorrect resulting in software being unable to access the stored data, credentials are incorrect or not propagated to all network domains resulting in access being denied to some network domains, etc.), software issues (e.g., an agent is deployed on hardware that does not support all the features of the software component that is being emulated, software is improperly configured, etc.), hardware issues (e.g., memory usage is near maximum, storage is near maximum, processors are running at or near maximum capacity, etc.), communications issues (e.g., communication bottlenecks suggest the use of higher throughput communication technology or the addition of additional communication links, etc.), and other issues related to the computing system 100. The coordinator 114 may include a classifier component that uses machine learning (e.g., support vector machines or another machine learning algorithm) to analyze the activity data 130 and identify potential problems.

At 312, a system that has been modified (e.g., by changes to (1) the configuration, (2) the software, (3) the hardware, and the like) may be tested. At 314, a determination may be made as to whether the potential problems have been addressed. If a determination is made at 314, that ("no") the potential problems have not been addressed, then the process may proceed to 312, where the system may be re-tested after additional modifications are made to the system. If a determination is made at 314, that ("yes") the potential problems have been addressed, then the process may proceed to 316, where the multiple components that were being emulated by the multiple agents are installed. At 318, the multiple agents are uninstalled. For example, in FIG. 1, a system administrator may make modifications to the computing system 100, such as adding or upgrading resources (e.g. adding/upgrading memory, adding/upgrading storage, adding/upgrading processing power, adding/upgrading communication links, adding/upgrading software) modifying software configurations, rearranging where the agents 116, 118, 120 are located, modifying permissions, modifying credentials etc. After the computing system 100 has been modified, the agents 116, 118, 120 may be instructed to perform the activities 128, the activity data 130 may be gathered, and the coordinator may determine whether the problems have been addressed. For example, fewer error-related activity data may indicate that the problems have been addressed. The process of modifying the computing system and gathering activity data may continue until the potential problems have been addressed (e.g., the number of potential problems are below a threshold, etc.). In FIG. 2, after a determination is made that the potential problems have been addressed, the coordinator 114 may install the components 202, 204, 206 and uninstall the agents 116, 118, 120.

Thus, agents may be deployed in a computing system emulate components of a software package, such as change auditor software used to comply with legal standards (e.g., HIPAA, SOX, etc.) or industry standards (e.g., DSS, SAS, etc.). The agents may perform mock activities that emulate the activities of the components. Data associated with the mock activities may be gathered and analyzed to identify potential problems. The system may be modified and re-tested until the potential problems have been addressed. After the potential problems have been addressed, the components of the software package are installed and the agents are uninstalled. In some cases, each agent may install the component whose activities the agent was emulating. In this way, small software agents that can quickly be installed may be used to emulate the activities of components of a software package to identify and resolve potential problems before the large scale deployment of the components. Because many potential problems are resolved before the components are installed, the number of problems that occur during or after deploying the components of the software package may be relatively small, enabling an enterprise to seamlessly install the software package without having to endure weeks or months of troubleshooting.

FIG. 4 is a flowchart of a process 400 that includes gathering data associated with mock activities according to some embodiments. For example, the process 400 may be performed by software, such as the coordinator 114 of FIG. 1, executing on the central server 108.

At 402, locations in a computing system in which multiple components of a software package are to be installed are identified. At 404, multiple agents may be installed in the locations in which the multiple components are to be installed. At 406, one or more agents of the multiple agents may be instructed to perform mock activities (e.g., to emulate individual components of the multiple components). For example, in FIG. 1, the coordinator 114 may determine particular locations where the components 113 are to be installed and install the agents 116, 118, 120 in the particular locations in the computing system 100. The coordinator 114 may instruct one or more of the agents 116, 118, 120 to initiate the mock activities 128 (e.g., generating event logs or performing activities that cause event logs to be generated) to emulate activities of the components 113.

At 408, data associated with the mock activities (e.g., performance-related data, configuration-related data, etc.) may be gathered. At 410, potential problems may be identified (e.g., based on the activity data). For example, in FIG. 1, the coordinator 114 may monitor the mock activities 128 and gather the activity data 130 over a predetermined period of time (e.g., N hours or M days). The activity data 130 may be correlated to identify specific types of problems. For example, the activity data 130 may be correlated based on various criteria to identify configuration issues (e.g., permissions of stored data are incorrect resulting in software being unable to access the stored data, credentials are incorrect or not propagated to all network domains resulting in access being denied to some network domains, etc.), software issues (e.g., an agent is deployed on hardware that does not support all the features of the software component that is being emulated, software is improperly configured, etc.), hardware issues (e.g., memory usage is near maximum, storage is near maximum, processors are running at or near maximum capacity, etc.), communications issues (e.g., communication bottlenecks suggest the use of higher throughput communication technology or the addition of additional communication links, etc.), and other issues related to the computing system 100. The coordinator 114 may include a classifier component that uses machine learning (e.g., support vector machines or another machine learning algorithm) to analyze the activity data 130 and identify potential problems.

At 412, a determination may be made as to whether the potential problems have been addressed (e.g., after the computing system has been modified). If a determination is made at 412, that ("no") the potential problems have not been addressed, then the process may proceed to 406, where one or more of 406, 408, 410, and 412 may be repeated until a determination is made that the potential problems have been addressed. If a determination is made at 412, that ("yes") the potential problems have been addressed, then the process may proceed to 414, where the multiple components corresponding to the multiple agents may be installed. At 416, the multiple agents may be uninstalled. For example, in FIG. 1, a system administrator may make modifications to the computing system 100, such as adding or upgrading resources (e.g. adding/upgrading memory, adding/upgrading storage, adding/upgrading processing power, adding/upgrading communication links, adding/upgrading software) modifying software configurations, rearranging where the agents 116, 118, 120 are located, modifying permissions, modifying credentials etc. After the computing system 100 has been modified, the agents 116, 118, 120 may be instructed to perform the activities 128, the activity data 130 may be gathered, and the coordinator may determine whether the problems have been addressed. For example, fewer error-related activity data may indicate that the problems have been addressed. The process of modifying the computing system and gathering activity data may continue until the potential problems have been addressed (e.g., the number of potential problems are below a threshold, etc.). In FIG. 2, after a determination is made that the potential problems have been addressed, the coordinator 114 may install the components 202, 204, 206 and uninstall the agents 116, 118, 120.

Thus, agents may be deployed in a computing system emulate components of a software package, such as change auditor software used to comply with legal standards (e.g., HIPAA, SOX, etc.) or industry standards (e.g., DSS, SAS, etc.). The agents may perform mock activities that emulate the activities of the components. Data associated with the mock activities may be gathered and analyzed to identify potential problems. The system may be modified and re-tested until the potential problems have been addressed. After the potential problems have been addressed, the components of the software package are installed and the agents are uninstalled. In some cases, each agent may install the component whose activities the agent was emulating. In this way, small software agents that can quickly be installed may be used to emulate the activities of components of a software package to identify and resolve potential problems before the large scale deployment of the components. Because many potential problems are resolved before the components are installed, the number of problems that occur during or after deploying the components of the software package may be relatively small, enabling an enterprise to seamlessly install the software package without having to endure weeks or months of troubleshooting.

FIG. 5 is a flowchart of a process 500 that includes instructing an agent to perform mock activities to emulate activities of a component according to some embodiments.

For example, the process 500 may be performed by software, such as the coordinator 114 of FIG. 1, executing on the central server 108.

At 502, an agent may be installed in location (e.g., in a computing system) in which a component of a software package is to be installed. At 504, the agent may be instructed to perform mock activities to emulate activities of the component. For example, in FIG. 1, the coordinator 114 may install the agents 116, 118, 120 in locations where the components 113 are to be installed. The coordinator 114 may instruct one (or more) of the agents 116, 118, 120 to initiate the mock activities 128 (e.g., generating event logs or performing activities that cause event logs to be generated) to emulate activities of the corresponding components 113. For example, the agent 116(1) may perform mock activities that emulate activities of the component 202(1), the agent 116(R) may perform mock activities that emulate the activities of the component 202(R), and so on.

At 506, data associated with the mock activities (e.g., performance-related data, configuration-related data, etc.) may be gathered. At 508, a potential problem may be identified (e.g., based on the activity data). For example, in FIG. 1, the coordinator 114 may monitor the mock activities 128 and gather the activity data 130 over a predetermined period of time (e.g., N hours or M days). The activity data 130 may be correlated to identify specific types of problems. For example, the activity data 130 may be correlated based on various criteria to identify configuration issues (e.g., permissions of stored data are incorrect resulting in software being unable to access the stored data, credentials are incorrect or not propagated to all network domains resulting in access being denied to some network domains, etc.), software issues (e.g., an agent is deployed on hardware that does not support all the features of the software component that is being emulated, software is improperly configured, etc.), hardware issues (e.g., memory usage is near maximum, storage is near maximum, processors are running at or near maximum capacity, etc.), communications issues (e.g., communication bottlenecks suggest the use of higher throughput communication technology or the addition of additional communication links, etc.), and other issues related to the computing system 100. The coordinator 114 may include a classifier component that uses machine learning (e.g., support vector machines or another machine learning algorithm) to analyze the activity data 130 and identify potential problems.

At 510, a determination may be made as to whether the potential problem has been addressed (e.g., after the computing system has been modified). If a determination is made at 510, that ("no") the potential problem has not been addressed, then the process may proceed to 506, where one or more of 506, 508, 510 may be repeated until a determination is made that the potential problem has been addressed. If a determination is made at 510, that ("yes") the potential problem has been addressed, then the process may proceed to 414, where the component corresponding to the agent may be installed. At 416, the agent may be uninstalled. For example, in FIG. 1, a system administrator may make modifications to the computing system 100, such as adding or upgrading resources (e.g. adding/upgrading memory, adding/upgrading storage, adding/upgrading processing power, adding/upgrading communication links, adding/upgrading software) modifying software configurations, rearranging where the agents 116, 118, 120 are located, modifying permissions, modifying credentials etc. After the computing system 100 has been modified, the agents 116, 118, 120 may be instructed to perform the activities 128, the activity data 130 may be gathered, and the coordinator may determine whether the problems have been addressed. For example, fewer error-related activity data may indicate that the problems have been addressed. The process of modifying the computing system and gathering activity data may continue until the potential problems have been addressed (e.g., the number of potential problems are below a threshold, etc.). In FIG. 2, after a determination is made that the potential problems have been addressed, the coordinator 114 may install the components 202, 204, 206 and uninstall the agents 116, 118, 120.

Thus, agents may be deployed in a computing system emulate components of a software package, such as change auditor software used to comply with legal standards (e.g., HIPAA, SOX, etc.) or industry standards (e.g., DSS, SAS, etc.). The agents may perform mock activities that emulate the activities of the components. Data associated with the mock activities may be gathered and analyzed to identify potential problems. The system may be modified and re-tested until the potential problems have been addressed. After the potential problems have been addressed, the components of the software package are installed and the agents are uninstalled. In some cases, each agent may install the component whose activities the agent was emulating. In this way, small software agents that can quickly be installed may be used to emulate the activities of components of a software package to identify and resolve potential problems before the large scale deployment of the components. Because many potential problems are resolved before the components are installed, the number of problems that occur during or after deploying the components of the software package may be relatively small, enabling an enterprise to seamlessly install the software package without having to endure weeks or months of troubleshooting.

Figure 6:
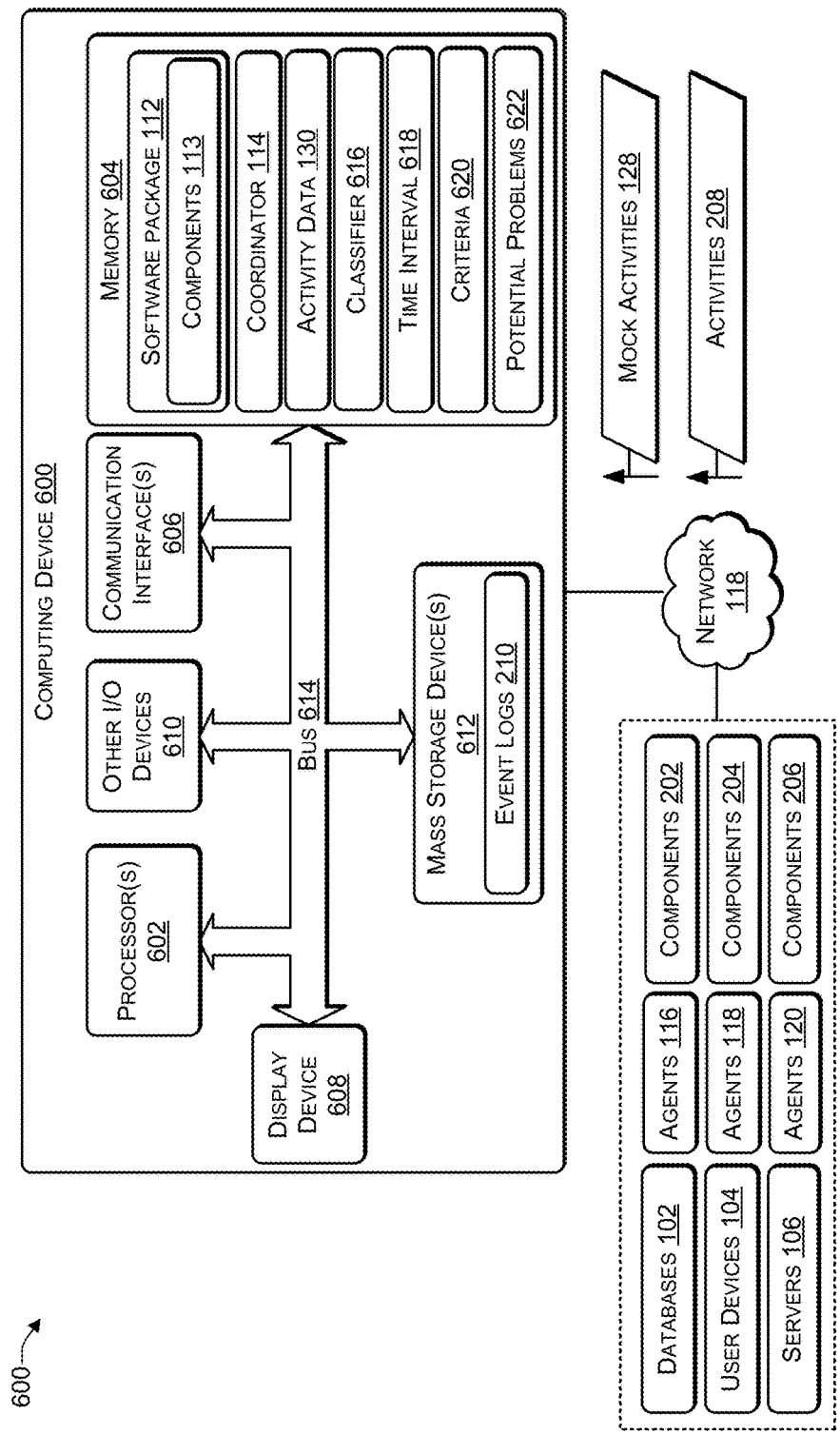
FIG. 6 illustrates an example configuration of a computing device that can be used to implement the systems and techniques described herein.

FIG. 6 illustrates an example configuration of a computing device that can be used to implement the systems and techniques described herein, such as to implement one or more of the central server 108, the databases 102, the user devices 104, the servers 106, or the cloud servers 122 of FIG. 1. The computing device 600 may include at least one processor 602, a memory 604, communication interfaces 606, a display device 608, other input/output (I/O) devices 610, and one or more mass storage devices 612, configured to communicate with each other, such as via a system bus 614 or other suitable connection.

The processor 602 is a hardware device that may include a single processing unit or a number of processing units, all of which may include single or multiple computing units or multiple cores. The processor 602 can be implemented as one or more microprocessors, microcomputers, microcontrollers, digital signal processors, central processing units, state machines, logic circuitries, and/or any devices that manipulate signals based on operational instructions. Among other capabilities, the processor 602 can be configured to fetch and execute computer-readable instructions stored in the memory 604, mass storage devices 612, or other computer-readable media.

Memory 604 and mass storage devices 612 are examples of computer storage media (e.g., memory storage devices) for storing instructions which are executed by the processor 602 to perform the various functions described above. For example, memory 604 may generally include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a media capable of storing computer-readable, processor-executable program instructions as computer program code that can be executed by the processor 602 as a particular machine configured for carrying out the operations and functions described in the implementations herein.

The computing device 600 may also include one or more communication interfaces 606 for exchanging data via the network 118 with network elements (e.g., the databases 102, the user devices 104, and the servers 106). The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 602.11, Bluetooth, Wireless USB, cellular, satellite, etc.), the Internet and the like. Communication interfaces 606 can also provide communication with external storage (not shown), such as in a storage array, network attached storage, storage area network, or the like.

A display device 608, such as a monitor may be included in some implementations for displaying information and images to users. Other I/O devices 610 may be devices that receive various inputs from a user and provide various outputs to the user, and may include a keyboard, a remote controller, a mouse, a printer, audio input/output devices, and so forth.

The computer storage media, such as memory 604 and mass storage devices 612, may be used to store software and data. For example, the computer storage media may be used to store software instructions and data. To illustrate, the data may include the components 113 of the software package 112, the coordinator 114, and a classifier 616 (e.g., a machine learning algorithm, such as a support vector machine). The data may include a time interval 618 within which to gather the activity data 130 associated with the mock activities 128 and criteria 620 used to correlate the activity data 130 to determine potential problems 622.

Thus, the coordinator 114 may install the agents 102, 104, 106 in a computing system. The agents 102, 104, 106 may correspond to the components 202, 204, 206, respectively and may be deployed in locations in the computing system where the components 202, 204, 206 would be installed. For example, the agents 116 may be installed in locations near the databases 102, the agents 118 may be installed in locations near the user devices 104, and the agents 120 may installed in locations near the servers 106. The agents 102, 104, 106 may perform the mock activities 128 that emulate the activities 208 that the components 202, 204, 206 perform after the components 202, 204, 206 are installed. The coordinator 114 may gather the activity data 130 associated with the mock activities 128 within the time interval 618. The classifier 616 may use the activity data 130 to identify the potential problems 622 using the criteria 620. One or more modifications may be performed to the computing system 100 of FIG. 1 and additional activity data gathered and analyzed by the classifier 616 to determine if the potential problems 622 have been addressed The process of modifying the computing system 100, gathering the activity data 130, and analyzing the activity data 130 (e.g., using the classifier 616) to identify the potential problems 622 may be repeated until the potential problems 622 have been addressed (e.g., until the number and/or the severity of the potential problems 622 satisfy a predetermined threshold).

After the potential problems 622 have been addressed, the components 202, 204, 206 (e.g., corresponding to the agents 116, 118, 120, respectively) may be installed in the computing system 200. The components 202, 204, 206 may perform the activities 208. For example, the components 202 may be installed to generate a portion of the event logs 210 based on events associated with the databases 102. The components 204 may be installed to generate a portion of the event logs 210 based on events associated with the user devices 104. The components 206 may be installed to generate a portion of the event logs 210 based on events associated with the servers 106. The agents 116, 118, 120 may be uninstalled from the computing system 200. Because the potential problems 622 have been addressed prior to installing the components 202, 204, 206, fewer problems may arise after the components 202, 204, 206 are installed, resulting in a relatively smooth and problem-free deployment of the components 113 of the software package 112.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, and code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computer-implemented method, comprising:
   identifying, by one or more processors, a plurality of components of a software package to be installed in a computing system;
   determining, by the one or more processors, individual locations in the computer system in which to install individual components of the plurality of components;
   installing, by the one or more processors, individual agents of a plurality of agents in the individual locations, wherein individual agents of the plurality of agents correspond to individual components of the plurality of components;
   instructing, by the one or more processors, individual agents of the plurality of agents to perform mock activities that mimic activities of the individual components of the plurality of components;
   gathering, by the one or more processors, activity data associated with the mock activities within a predetermined time period;
   displaying at least a portion of the activity data;
   identifying, by a classifier executed by the one or more processors, a first potential problem based at least in part on the activity data;
   performing a first modification to the computing system to address the first potential problem;
   instructing each agent of the plurality of agents to download and install a corresponding component of the plurality of components;
   instructing individual components of the plurality of components to initiate a corresponding activity; and
   uninstalling the plurality of agents from the computing system.

2. The computer-implemented method of claim 1, further comprising:
   correlating, by the one or more processors, the activity data based on criteria comprising at least one of a bandwidth usage of one more communication links in the computing system, a performance of one or more network elements in the computing system, or a usage associated with a resource in the computing system, wherein the resource comprises one of memory usage or processing capacity.

3. The computer-implemented method of claim 1, further comprising:
   installing the individual components corresponding to the individual agents; and
   uninstalling the plurality of agents.

4. The computer-implemented method of claim 3, wherein the first potential problem is associated with at least one of:
- a topology of the computing system;
- a resource associated with a network element of the computing system, wherein the resource comprises at least one of a memory capacity of the network element, a storage capacity of the network element, a processing capacity of the network element, or a networking bandwidth of the network element;
- permissions associated with data stored in the computing system; or
- credentials associated with at least one agent of the plurality of agents.

5. The computer-implemented method of claim 1, further comprising:
- instructing the plurality of agents to perform additional mock activities based at least in part on determining that a first modification has been performed to the computing system;
- determining additional activity data associated with the additional mock activities; and
- identifying a second potential problem based on the additional activity data.

6. The computer-implemented method of claim 5, further comprising:
- determining that a second modification to the computing system addresses the second potential problem.

7. The computer-implemented method of claim 1, wherein the individual agents perform one or more of the mock activities to emulate one or more component activities associated with the individual components corresponding to the individual agents.

8. One or more non-transitory computer-readable media storing instructions that are executable by one or more processors to perform operations comprising:
- determining a software package to be installed in a computing system, the software package comprising a plurality of components;
- determining a location in the computer system in which to install a component of the plurality of components;
- installing an agent of a plurality of agents in the location, wherein the agent corresponds to the component of the plurality of components;
- instructing the agent to perform mock activities that emulate activities associated with the component;
- determining activity data associated with the mock activities performed by the agent;
- identifying, by a classifier, at least one potential problem based at least in part on the activity data;
- determining that the at least one potential problem has been addressed;
- instructing individual agents of the plurality of agents to download and install a corresponding component of the plurality of components;
- instructing individual components of the plurality of components to initiate a corresponding activity; and
- uninstalling the plurality of agents from the computing system.

9. The one or more non-transitory computer-readable media of claim 8, the operations further comprising:
- installing the component corresponding to the agent; and
- uninstall the agent.

10. The one or more non-transitory computer-readable media of claim 9, wherein the at least one potential problem is associated with at least one of:
- a topology of the computing system;
- a resource associated with a network element of the computing system, wherein the resource comprises at least one of a memory capacity of the network element, a storage capacity of the network element, a processing capacity of the network element, or a networking bandwidth of the network element;
- permissions associated with data stored in the computing system; or
- credentials associated with at least one agent of the plurality of agents.

11. The one or more non-transitory computer-readable media of claim 8, further comprising:
- instructing the agent to perform additional mock activities after determining that a modification to the computing system has been made, the modification determined based at least in part on the activity data; and
- determining additional activity data associated with the additional mock activities.

12. The one or more non-transitory computer-readable media of claim 11, further comprising:
- determining, based at least in part on the additional activity data, that the modification to the computing system addresses a potential problem in the computing system.

13. The one or more non-transitory computer-readable media of claim 11, further comprising:
- performing an additional modification to the computing system; and
- determining that the additional modification addresses the potential problem.

14. A server, comprising:
- one or more processors; and
- one or more non-transitory computer-readable media storing instructions that are executable by the one or more processors to perform operations comprising:
  - determining a plurality of components included in a software package that is to be installed in a computing system;
  - installing, in the computing system, an agent of a plurality of agents, wherein the agent corresponds to a component of the plurality of components, wherein the agent is installed in a location where the component is to be installed;
  - instructing, by a software installation coordinator, the agent to perform mock activities that emulate activities associated with the component;
  - determining activity data associated with the mock activities;
  - identifying, by a classifier algorithm, a potential problem based at least in part on the activity data;
  - determining that the potential problem has been addressed;
  - instructing, by the software installation coordinator, individual agents of the plurality of agents to download and install a corresponding component of the plurality of components;
  - instructing, by the software installation coordinator, individual components of the plurality of components to initiate a corresponding activity; and
  - uninstalling, by the software installation coordinator, the plurality of agents from the computing system.

15. The server of claim 14, the operations further comprising:
- installing in the computing system the component corresponding to the agent; and
- uninstalling the agent from the computing system.

16. The server of claim 14, further comprising:
generating, by the component, an event log associated with an event occurring in the computing system, wherein the event log is associated with complying with a government auditing standard or an industry auditing standard.

17. The server of claim 16, wherein the event log comprises at least one of: a logon event log, a logoff event log, a failed logon event log, a directory accessed event log, a file created event log, a directory accessed event log, a data accessed event log, or a data copied event log.

18. The server of claim 14, wherein identifying the potential problem based at least in part on the activity data comprises:
correlating the activity data based on one or more criteria to create correlated activity data; and
identifying, using a classifier, the potential problem based at least in part on the correlated activity data.

19. The server of claim 14, wherein determining that the potential problem has been addressed comprises:
performing a modification to the computing system based at least in part on the activity data;
instructing the plurality of agents to perform additional mock activities in the modified computing system;
gathering additional activity data associated with the additional mock activities; and
determining that the potential problem has been addressed based at least in part on the additional activity data.

20. The server of claim 19, wherein the modification to the computing system comprises at least one of:
modifying a topology of the computing system;
adding a resource associated with a network element of the computing system, wherein the resource comprises at least one of a memory capacity of the network element, a storage capacity of the network element, a processing capacity of the network element, or a networking bandwidth of the network element;
modifying permissions associated with data stored in the computing system; or
modifying credentials associated with at least one agent of the plurality of agents.

* * * * *